United States Patent [19]

Fredericks

[11] Patent Number: 4,636,172

[45] Date of Patent: Jan. 13, 1987

[54] TEACHING APPARATUS

[76] Inventor: Barbara A. Fredericks, 2020 Carolina Ave., NE., St. Petersburg, Fla. 33703

[21] Appl. No.: 783,015

[22] Filed: Oct. 2, 1985

[51] Int. Cl.$^4$ .............................................. G09B 1/06
[52] U.S. Cl. ..................................... 434/159; 434/170
[58] Field of Search ............... 434/156, 159, 167, 168, 434/170, 172

[56] References Cited

U.S. PATENT DOCUMENTS

| | | | |
|---|---|---|---|
| 1,055,151 | 3/1913 | Emerson | 434/172 X |
| 1,479,423 | 1/1924 | Barton | 434/172 |
| 1,571,488 | 2/1926 | Moisan et al. | 434/170 X |
| 2,635,360 | 4/1953 | Bishop | 434/172 |
| 4,378,214 | 3/1983 | Scherer | 434/170 X |

FOREIGN PATENT DOCUMENTS

| | | | |
|---|---|---|---|
| 1121715 | 3/1956 | France | 434/172 |
| 460185 | 10/1950 | Italy | 434/159 |

*Primary Examiner*—William H. Grieb

[57] ABSTRACT

A teaching apparatus includes an elongated flexible support member that may be attached to a vertical wall by connectors secured to the upper edge thereof. Two rows of flexible pockets are secured to the support member in parallel relationship. Each pocket in the first row has a different upper case letter of the alphabet and each pocket in the second row has a lower case letter corresponding to the upper case letter on the adjacent pocket in the first row. A plurality of objects having the general configuration of a doll are provided with corresponding upper and lower case letters of the alphabet on opposite sides thereof and the dolls are dimensioned to be positioned and securely held within the pockets. The letters on the pockets and dolls may be made from a unique fabric and color combination so that each letter is distinguishable from the other letters by fabric texture and color as well as configuration.

3 Claims, 5 Drawing Figures

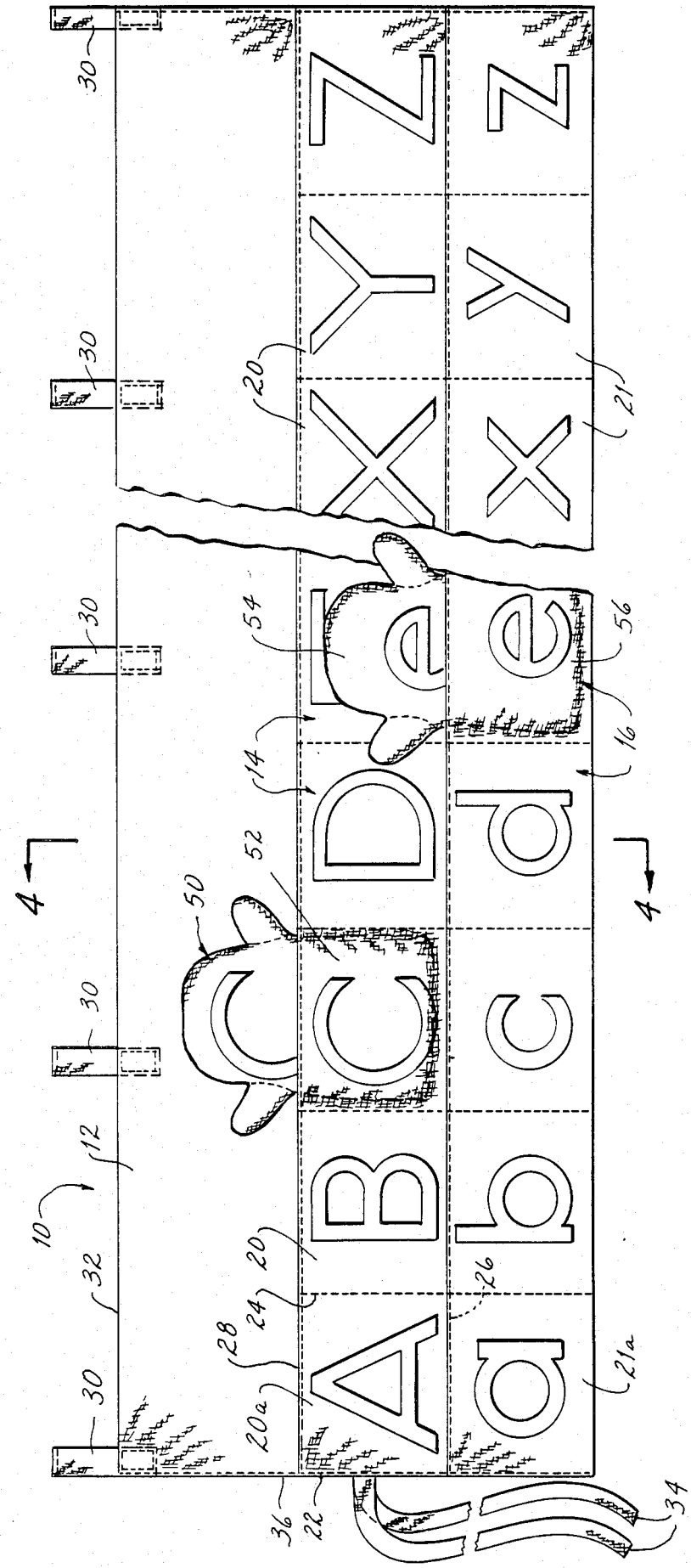

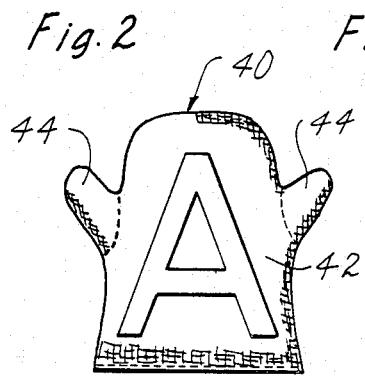
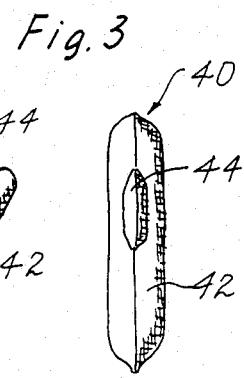
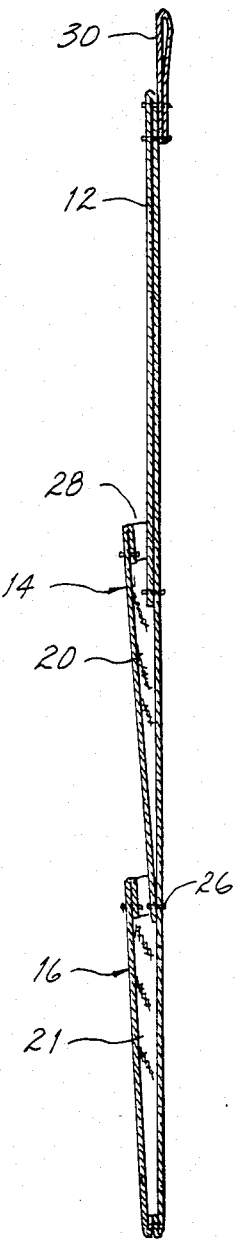
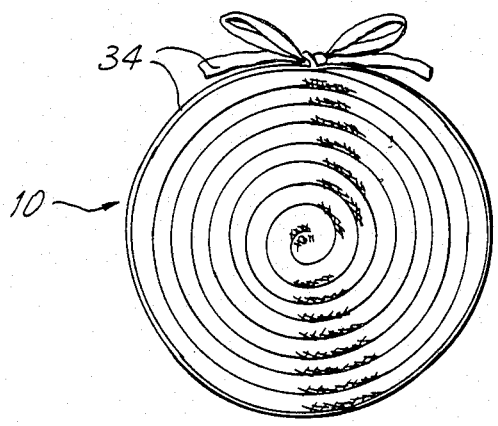

TEACHING APPARATUS

BACKGROUND OF THE INVENTION

1. Technical Field

The present invention relates to teaching and learning aids and, more particularly, to a unique apparatus and system for teaching the letters of the alphabet and other reading readiness skills.

2. Discussion of the Prior Art

Because knowledge of the alphabet is critical to the development of reading skills, the creation of devices and systems to assist in teaching the letters of the alphabet has always been of great interest.

Simple approaches, such as writing the letters on a blackboard, have been utilized for years. However, many of these approaches have lacked the hands-on situations that are required to maintain interest and promote learning ability.

Certain hands-on devices, such as cubes or blocks with letters on the various sides thereof, have been developed and currently are utilized for teaching kindergarten and pre-school students. However, many of the devices and systems lack the versatility to be used to develop color identification and basic shape recognition in addition to the desired alphabet skills.

OBJECTS AND SUMMARY OF THE PRESENT INVENTION

It is therefore an object of the present invention to provide a teaching apparatus and reading readiness program which is designed to aid in hands-on learning situations.

It is another object of this invention to provide an apparatus and system that will assist in the development of color identification and basic shape recognition.

A further object of the present invention is to provide an apparatus and system for assisting in the development of language and orientation skills.

In accordance with the present invention, two parallel rows of soft, flexible pockets are attached to an elongated support member that may be removably secured to a substantially vertical wall. When not in use, the support member preferably may be removed from its support and rolled up into a compact unit for storage.

A different upper case letter of the alphabet appears on each pocket in the first row and a corresponding lower case letter appears on the immediately adjacent pocket in the second row.

In order to maintain the interest of the students and enhance the learning situation, small "dolls" are provided which have upper case and corresponding lower case letters on opposite sides thereof. The dolls are dimensioned to fit snugly within the pockets when placed there by the students. A typical learning situation involves the placement of the doll having the upper case letter "A" on one side thereof in the pocket with the upper case letter "A." This provides a hands-on experience and permits the student to visually distinguish the letter "A" from all other letters, including the lower case letters.

As a further feature of the invention, the teaching apparatus may include letters that are formed from unique fabric and color combinations so that each letter is distinguishable from the other letters by fabric texture and color as well as configuration. For example, the letter "G" may be formed from a green fabric and, thus, provide a color identification experience for the student in addition to the alphabet learning experience.

BRIEF DESCRIPTION OF THE DRAWING

These and other objects, features and many of the attendant advantages of the present invention will be better understood upon reading the following detailed description considered in connection with the accompanying drawing wherein like parts in each of the several figures are identified by the same reference numerals and wherein:

FIG. 1 is a top plan view of a teaching apparatus according to the present invention;

FIG. 2 is a top plan view of one of the "dolls" which is part of the overall apparatus of the present invention;

FIG. 3 is a side view of the "doll" of FIG. 2;

FIG. 4 is a view in section taken along line 4—4 of FIG. 1; and

FIG. 5 is a side view showing the apparatus of FIG. 1 in a rolled-up position.

DESCRIPTION OF THE PREFERRED EMBODIMENTS

Referring to FIG. 1 in greater detail, a teaching apparatus, constructed in accordance with the present invention, is shown generally at 10. Apparatus 10 is comprised of an elongated, flexible support panel 12 having a first row of receptacles or pockets 14 and a second row of receptacles or pockets 16. Panel 12 and the rows of pockets 14 and 16 preferably are formed by stitching together fabric sheets as more clearly shown in FIG. 4.

Each pocket 20 in the first row of pockets 14 is stitched or otherwise secured to panel 12 along its sides and lower edge, the upper edge remaining unsecured to provide an opening to the interior of the pocket. For example, pocket 20a on the far left in FIG. 1 may be stitched to panel 12 along sides 22 and 24 and lower edge 26. Upper edge 28 remains unsecured to form an opening between panel 12 and pocket 20a. The pockets 21 in the second row of pockets 16 are similarly formed and secured to panel 12.

A plurality of connecting straps or loops 30 may be secured to the upper edge 32 of panel 12 to enable the panel to be supported on hooks or other suitable securement devices on a vertical wall or other support surface. Ties 34 are secured to at least one side edge of panel 12 to secure the panel after it has been rolled up for storage as shown in FIG. 5.

Although the size of teaching apparatus 10 is not critical, it is preferred that the length be approximately 144 inches and that the width be approximately 14 inches. The width of pockets 20 and 21 may be about 5½ inches. These dimensions facilitate visualization and use of the apparatus. Preferably, panel 12, pockets 20 and 21, and all other components used in the construction of the teaching apparatus are made from mildew-proof, color fast materials, such as polyester canvas or cotton-polyester fabric that may be stored under adverse conditions and easily cleaned with a damp cloth.

Although teaching apparatus 10 may be used to teach a variety of subjects, such as numbers, names, etc., it primarily is intended for use in teaching the letters of the alphabet. Therefore, referring to FIG. 1, each pocket 20 in the first row of pockets 14 is provided with a different upper case letter of the alphabet. Pockets containing letters A through E and X through Z specifically are illustrated in FIG. 1, it being understood that letters F through W have been intentionally omitted in order to avoid unnecessary illustrations. In a similar manner, lower case letters appear on each pocket in the second row of pockets 16 with corresponding letters being positioned vertically adjacent each other. For example, upper case letter "A" appears on pocket 20a and lower case letter "a" appears on pocket 21a vertically below pocket 20a. Thus, a pocket is provided for each upper case letter of the alphabet and a vertically adjacent pockect is provided for the corresponding lower case letter.

In order to enhance the learning experience and increase the interest of the student, a plurality of characters or objects having the general configuration of a "doll" are provided. Referring to FIGS. 2 and 3, a doll shown generally at 40 has a body portion 42 and arms 44. The dolls preferably are made from cotton-polyester fabric and are stuffed with non-allergenic polyester fiberfill to provide a soft and safe "toy" which may be used in the learning experience.

Dolls 40 are approximately six inches in height and six inches wide and are designed to fit snugly within pockets 20 and 21 after they have been placed therein by the students. Each doll has a different upper case letter and corresponding lower case letter on each side thereof, the letters corresponding to the letters on the pockets.

It will be apparent from the foregoing description that one of the objects of the present invention is achieved by instructing the student to select a doll 40 having a specified upper or lower case letter of the alphabet and to place the doll in the appropriate pocket. For example, a doll 50 having an upper case letter "C" is shown in pocket 52 and another doll 54 having a lower case letter "e" is shown in pocket 56.

As a further feature of the invention, all of the different letters of the alphabet may be made from a different fabric having a distinct texture and/or color. This will further enhance the educational procedure by providing the student with a tactile and visual learning experience. For example, the letter "Y" may be shaped from a yellow fabric and the student may be exposed to the color yellow at the same time the letter "Y" is being learned. Also, fabrics having identifiable textures and patterns, such as corduroys and plaids, may be used for the construction of the various letters.

All of the foregoing features may be used to structure a unique reading readiness program including constructive, imaginative activities in hands-on learning situations.

Having described a preferred embodiment of a new and improved teaching apparatus constructed in accordance with the present invention, it is believed that other modifications, variations and changes will be suggested to those skilled in the art in view of the foregoing description. It is therefore to be understood that all such variations, modifications and changes are believed to fall within the scope of the present invention as defined in the appended claims.

I claim:

1. Teaching apparatus comprising: an elongated flexible support member; a first row of pockets secured to said support member, each of said pockets having a different upper case letter of the alphabet thereon; a second row of pockets secured to said support member, each of said pockets in said second row having a different lower case letter of the alphabet thereon adjacent the corrresponding upper case letter in said first row; a plurality of soft, compressible dolls sized to fit snugly within said pockets, each of said dolls having different upper and lower case letter of the alphabet on opposite sides thereof corresponding to the letters in the first and second rows of pockets; each different letter on said pockets and the corresponding letter on said dolls being made from a unique fabric and color combination so that each letter is distinguishable from the other letters by fabric as well as configuration.

2. The apparatus of claim 1, wherein said elongated support member and rows of pockets are constructed from flexible material and may be shaped into a roll to facilitate storage.

3. The apparatus of claim 2, further comprising means on the upper edge of said support member for connecting said member to a vertical support.

* * * * *